US009914328B2

(12) United States Patent
Abad et al.

(10) Patent No.: US 9,914,328 B2
(45) Date of Patent: Mar. 13, 2018

(54) INFLATABLE OBJECT PROVIDED WITH A GAS-TIGHT LAYER CONTAINING A THERMOPLASTIC ELASTOMER AND A HYDROCARBON-BASED RESIN

(75) Inventors: Vincent Abad, Clermont-Ferrand (FR); Marc Greiveldinger, Clermont-Ferrand (FR)

(73) Assignee: COMPAGNIE GENERALE DES ETABLISSEMENTS MICHELIN, Granges-Paccot (CH)

( * ) Notice: Subject to any disclaimer, the term of this patent is extended or adjusted under 35 U.S.C. 154(b) by 702 days.

(21) Appl. No.: 13/640,974

(22) PCT Filed: Apr. 14, 2011

(86) PCT No.: PCT/EP2011/055921
§ 371 (c)(1),
(2), (4) Date: Apr. 17, 2013

(87) PCT Pub. No.: WO2011/131560
PCT Pub. Date: Oct. 27, 2011

(65) Prior Publication Data
US 2013/0196086 A1 Aug. 1, 2013

(30) Foreign Application Priority Data

Apr. 21, 2010 (FR) ...................................... 10 53025

(51) Int. Cl.
| B60C 1/00 | (2006.01) |
| C08L 23/22 | (2006.01) |
| C08L 53/00 | (2006.01) |
| B60C 5/14 | (2006.01) |
| C08K 5/01 | (2006.01) |

(52) U.S. Cl.
CPC .............. B60C 1/0008 (2013.01); B60C 5/14 (2013.01); C08L 23/22 (2013.01); C08L 53/00 (2013.01); *C08K 5/01* (2013.01); *C08L 2207/322* (2013.01)

(58) Field of Classification Search
CPC ......... B60C 1/0008; B60C 5/14; C08L 53/00; C08L 77/00; C08L 77/06; C08L 2666/14
USPC .......................................................... 152/510
See application file for complete search history.

(56) References Cited

U.S. PATENT DOCUMENTS

| 4,946,899 A | 8/1990 | Kennedy et al. .............. 525/244 |
| 5,260,383 A | 11/1993 | Osman ........................... 525/232 |
| 7,595,365 B2* | 9/2009 | Kappes |
| 8,563,098 B2 | 10/2013 | Abad et al. ....................... 428/12 |
| 2004/0194863 A1 | 10/2004 | Grah .............................. 152/510 |
| 2009/0247702 A1 | 10/2009 | Su et al. ........................... 525/98 |
| 2010/0036038 A1* | 2/2010 | Rodgers ................. B60C 1/0008 |
| 2010/0175804 A1 | 7/2010 | Lesage et al. ................. 152/511 |
| 2010/0210163 A1* | 8/2010 | He ........................... C08L 53/02 442/149 |
| 2010/0263778 A1 | 10/2010 | Lesage et al. ................. 152/511 |
| 2011/0011511 A1 | 1/2011 | Miyazaki et al. ............. 152/564 |
| 2011/0061782 A1* | 3/2011 | Merino Lopez ........... B60C 5/04 152/503 |
| 2011/0198009 A1 | 8/2011 | Merino-Lopez et al. .... 152/502 |
| 2012/0149822 A1 | 6/2012 | Abad et al. ..................... 524/449 |
| 2012/0175033 A1* | 7/2012 | Lavialle .................... B60C 9/18 152/526 |
| 2012/0234449 A1 | 9/2012 | Greiveldinger et al. ..... 152/502 |
| 2012/0285597 A1 | 11/2012 | Abad et al. ..................... 152/450 |
| 2012/0315408 A1 | 12/2012 | Chouvel et al. ................ 428/12 |
| 2013/0072621 A1 | 3/2013 | Abad et al. ..................... 524/505 |
| 2013/0168001 A1 | 7/2013 | Abad et al. ..................... 152/511 |
| 2013/0209716 A1 | 8/2013 | Custodero et al. .......... 428/36.8 |

FOREIGN PATENT DOCUMENTS

| EP | 0 731 112 A2 | 9/1996 |
| EP | 0 857 761 A1 | 8/1998 |
| EP | 1 431 343 A1 | 6/2004 |
| EP | 1 561 783 A1 | 8/2005 |
| EP | 1 566 405 A1 | 8/2005 |
| FR | 2 918 669 A1 | 1/2009 |
| JP | 2009-149711 | 7/2009 |
| JP | 2010-13617 | 1/2010 |
| WO | WO 2005/017013 A1 | 2/2005 |
| WO | 2005/103146 A1 | 11/2005 |
| WO | 2006/047509 A2 | 5/2006 |
| WO | 2008/145276 A1 | 12/2008 |

(Continued)

OTHER PUBLICATIONS

U.S. Appl. No. 14/116,059, filed May 4, 2012.
Z. Fodor, et al., "Polyisobutylene-containing block polymers by sequential monomer addition", Polymer Bulletin, vol. 29 (6), pp. 697-704 (1992).
J. Puskas, et al., "Multiarm-Star Polyisobutylenes by Living Carbocationic Polymerization", Journal of Polymer Science: Part A: Polymer Chemistry, vol. 36, pp. 85-92 (1998).
J. Puskas, et al., "Synthesis and Characterization of Novel Dendritic (Arborescent, Hyperbranched) Polyisobutylene-Polystyrene Block Copolymers", Journal of Polymer Science: Part A: Polymer Chemistry, vol. 43, pp. 1811-1826 (2005).

(Continued)

*Primary Examiner* — Jeffrey Mullis
(74) *Attorney, Agent, or Firm* — Fitzpatrick, Cella, Harper & Scinto

(57) ABSTRACT

A pneumatic object is provided with a layer that is airtight to inflation gases. The layer includes an elastomer composition having at least a thermoplastic elastomer (TPE), as a sole elastomer or as a predominant elastomer by weight, and a hydrocarbon resin. A glass transition temperature of the hydrocarbon resin is above 0° C. The TPE is a copolymer that includes at least a central polyisobutylene block. Optionally, the elastomer composition includes an extender oil. Also optionally, the elastomer composition includes a platy filler selected from a group that includes graphites and phyllosilicates, such as micas, clays, and talcs. The pneumatic object may be an inner tube or a pneumatic tyre for a motor vehicle.

24 Claims, 1 Drawing Sheet

(56) References Cited

FOREIGN PATENT DOCUMENTS

| WO | 2008/145277 A1 | 12/2008 |
| WO | 2009/007064 A1 | 1/2009 |
| WO | 2009/059709 A1 | 5/2009 |
| WO | WO 2009/119232 A1 | 10/2009 |

OTHER PUBLICATIONS

J.E. Puskas, et al., "New Transparent Flexible UV-Cured Films from Polyisobutylene-Polyisoprene Block Polymers", Journal of Macromolecular Science-Chemistry, vol. A28(1), pp. 65-80 (1991).

J.P. Kennedy, et al., "Polyisobutylene-Containing Block Polymers by Sequential Monomer Addition. 8. Synthesis, Characterization, and Physical Properties of Poly (indene-b-isobutylene-b-indene) Thermoplastic Elastomers", Macromolecules, vol. 26, pp. 429-435 (1993).

J.P. Kennedy, et al., "Poly(methyl methacrylate)-block-polyisobutylene-block-poly (methyl methacrylate) Thermoplastic Elastomers: Synthesis, Characterization, and Some Mechanical Properties", Catalysis in Polymer Synthesis, E. Vandenberg ed., Washington DC, Chapter 20, pp. 258-277 (1992).

D. Feng, et al., "Facile Synthesis of Diphenylethylene End-Functional Polyisobutylene and its Applications for the Synthesis of Block Copolymers Containing Poly(methacrylate)s", Polymer, vol. 49, pp. 386-393 (2008).

R. Mildenberg, et al., Hydrocarbon Resins, VCH, New York, Chapter 5, pp. 141-146 (1997).

G. Kaszas, et al., "New Thermoplastic Elastomers of Rubbery Polyisobutylene and Glassy Cyclopolyisoprene Segments", Journal of Applied Polymer Science, vol. 39, pp. 119-144 (1990).

J.P. Kennedy, et al., "Polyisobutylene-Containing Block Polymers by Sequential Monomer Addition. 5. Synthesis, Characterization, and Select Properties of Poly (p-tert-butylstyrene-b-isobutylene-b-p-tert-butylstyrene)", Macromolecules, vol. 24, pp. 6572-6577 (1991).

J.E. Puskas, et al., "Polyisobutylene-Containing Block Polymers by Sequential Monomer Addition. IV. New Triblock Thermopolastic Elastomers Comprising High Tg Styrenic Glassy Segments: Synthesis, Characterization and Physical Properties", Journal of Polymer Science: Part A: Polymer Chemistry, vol. 30, pp. 41-48 (1992).

* cited by examiner

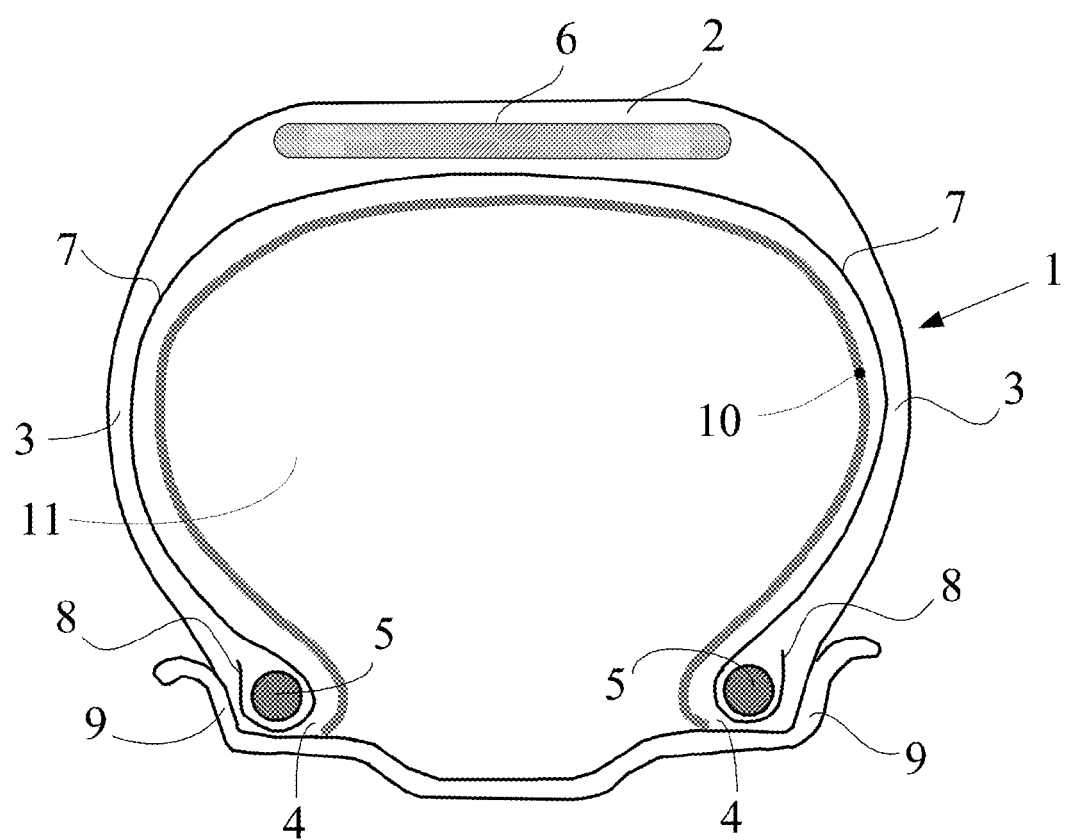

INFLATABLE OBJECT PROVIDED WITH A GAS-TIGHT LAYER CONTAINING A THERMOPLASTIC ELASTOMER AND A HYDROCARBON-BASED RESIN

FIELD OF THE INVENTION

The present invention relates to inflatable articles or "pneumatic" objects, that is to say, by definition, to objects which take their usable form when they are inflated with air or with an equivalent inflation gas.

It relates more particularly to the gastight layers which ensure that these pneumatic objects are airtight, in particular that pneumatic tyres are airtight.

BACKGROUND

In a conventional pneumatic tyre of the "tubeless" type (that is to say of the type without an inner tube), the radially internal face comprises an airtight layer (or more generally a layer airtight to any inflation gas) which makes it possible to inflate the pneumatic tyre and to keep it under pressure. Its airtightness properties allow it to guarantee a relatively low level of pressure loss, making it possible to keep the tyre inflated in a normal operating state for a sufficient period of time, normally of several weeks or several months. Another role of this layer is to protect the carcass reinforcement and more generally the remainder of the tyre from the risk of oxidation due to the diffusion of air originating from the space interior to the tyre.

This role of airtight inner layer or "inner liner" is today fulfilled by compositions based on butyl rubber (copolymer of isobutylene and isoprene), which have been recognized for a very long time for their excellent airtightness properties.

However, a well-known disadvantage of compositions based on butyl rubber or elastomer is that they exhibit high hysteresis losses, furthermore over a broad temperature spectrum, which disadvantage is damaging to the rolling resistance of the pneumatic tyres.

BRIEF DESCRIPTION OF THE INVENTION

To reduce the hysteresis of these airtight inner layers and thus, in the end, the fuel consumption of motor vehicles is a general objective which current technology comes up against.

However, the Applicant companies have discovered during their research that an elastomer composition other than a conventionally used butyl composition makes it possible to obtain airtight inner layers that meet such an objective, while guaranteeing excellent airtightness properties to the latter.

Recently, the Applicant companies described in document WO 2009/007064 a pneumatic object provided with a layer airtight to the inflation gases, in which the airtight layer comprises an elastomer composition comprising at least a styrene thermoplastic (TPS) elastomer and a platy filler at a volume content of greater than 5% (% by volume of the elastomer composition). Compared to a butyl rubber, the thermoplastic styrene elastomer has the major advantage, due to its thermoplastic nature, of being able to be worked as is in the molten (liquid) state and consequently of offering a possibility of simplified processing; it has also turned out to be compatible with the use of platy filler at particularly high contents, which makes it possible to improve the airtightness compared to the known prior art solutions based on butyl rubber.

In the continuance of their research, the Applicant companies have now discovered a composition in which the use of platy fillers is optional, the important factor being the use of a hydrocarbon resin and of an elastomer of block copolymer type containing an isobutylene central block.

This composition has also turned out to be compatible with the use of platy filler at particularly high contents, which makes it possible to further improve the airtightness compared to the known prior art solutions.

Thus, according to a first subject matter, the present invention relates to a pneumatic object provided with an elastomer layer airtight to the inflation gases, said layer comprising, as the sole elastomer or as the predominant elastomer by weight, at least a thermoplastic elastomer (TPE), and from 0 to 150 phr (parts by weight per hundred parts of elastomer) of an extender oil, in which the sole or predominant thermoplastic elastomer is a block copolymer comprising at least a central polyisobutylene block and in which said layer also comprises a hydrocarbon resin, the glass transition temperature of which hydrocarbon resin is above 0° C.

Preferably, the present invention relates to a pneumatic object as defined above in which the amount of carbon-based resin is from 5 to 300 phr, very preferably from 10 to 150 phr and very preferably from 15 to 70 phr.

Also preferably, the present invention relates to a pneumatic object as defined above in which the glass transition temperature of the hydrocarbon resin is above 40° C., and more preferably from 40° C. to 160° C.

Preferably, the present invention relates to a pneumatic object as defined above in which the number-average molecular weight of the block copolymer is between 30 000 and 500 000 g/mol, in the pneumatic object as defined previously.

Preferably, in the pneumatic object as defined above, the copolymer comprising a central polyisobutylene block also comprises blocks selected from polystyrene, polymethylstyrenes, poly(para-tert-butylstyrene), polychlorostyrenes, polybromostyrenes, polyfluorostyrenes, poly(para-hydroxystyrene), polyacenaphthylene, polyindene, poly(2-methylindene), poly(3-methylindene), poly(4-methylindene), polydimethylindenes, poly(2-phenylindene), poly(3-phenylindene), poly(4-phenylindene), polyisoprene, polymers of esters of acrylic acid, crotonic acid, sorbic acid and methacrylic acid, or polymers of derivatives of acrylamide, methacrylamide, acrylonitrile, and methacrylonitrile.

According to a first variant of the invention as defined above, the additional block copolymers of the polyisobutylene block are more particularly selected from polystyrene, polymethylstyrenes, poly(para-tert-butylstyrene), polychlorostyrenes, polybromostyrenes, polyfluorostyrenes, or poly (para-hydroxystyrene);
and more preferably still, the block copolymer is a styrene/isobutylene/styrene copolymer. Preferably, this block copolymer comprises between 5% and 50% by weight of styrene.

According to another variant of the invention, the pneumatic object defined above is such that the additional block copolymers of the polyisobutylene block are selected from polyacenaphthylene, polyindene, poly(2-methylindene), poly(3-methylindene), poly(4-methylindene), polydimethylindenes, poly(2-phenylindene), poly(3-phenylindene), poly(4-phenylindene), polyisoprene, polymers of esters of acrylic acid, crotonic acid, sorbic acid and methacrylic acid, or polymers of derivatives of acrylamide, methacrylamide, acrylonitrile, and methacrylonitrile.

Also preferably, the present invention relates to a pneumatic object as defined above in which the glass transition temperature of the block copolymer is below −20° C., and more preferably below −40° C.

Preferably, the present invention relates to a pneumatic object as defined above in which the extender oil content is less than 150 phr, more preferably less than 100 phr, more preferably still less than 75 phr and very preferably between 5 and 75 phr. Preferably, the extender oil is selected from the group consisting of polyolefin oils, paraffinic oils, naphthenic oils, aromatic oils, mineral oils and mixtures of these oils, more preferably from polybutene oils and very preferably the extender oil is a polyisobutylene oil. Preferably, the number-average molecular weight of the extender oil is between 200 and 25 000 g/mol.

Optionally and preferably, the pneumatic object as defined above also comprises a platy filler, the volume content of which is preferably from 2% to 50%. Preferably, the platy filler is selected from the group consisting of graphites, phyllosilicates, and mixtures of such fillers, and more preferably from the group consisting of graphites, talcs, micas, and mixtures of such fillers.

Preferably, the pneumatic object defined above is such that the gastight layer has a thickness greater than 0.05 mm, and more particularly between 0.1 mm and 10 mm. Preferably, this gastight layer is positioned on the inner wall of the pneumatic object.

Also preferably, the pneumatic object as defined above is made of rubber, and it is more preferably a pneumatic tyre.

Also preferably, said pneumatic object is an inner tube, and more particularly, a pneumatic tyre inner tube.

The invention relates more particularly to the pneumatic tyres intended to be fitted on motor vehicles of the passenger type, SUVs (Sport Utility Vehicles), two-wheel vehicles (especially motorcycles), aircraft, and also industrial vehicles selected from vans, "heavy-duty" vehicles, i.e., underground trains, buses, heavy road transport vehicles (lorries, tractors, trailers), off-road vehicles, such as agricultural or civil engineering machines, and other transport or handling vehicles.

The invention also relates to a process for rendering a pneumatic object airtight with respect to the inflation gases, in which a gastight layer as defined above is incorporated into said pneumatic object during its manufacture, or added to said pneumatic object after its manufacture.

The invention also relates to the use, in a pneumatic object, of an elastomer composition as defined above as a layer airtight to the inflation gases.

The invention and its advantages will be easily understood in light of the description and of the exemplary embodiments that follow, and also from the single figure relating to these examples.

BRIEF DESCRIPTION OF THE DRAWING

The single figure schematically shows, in radial cross section, a pneumatic tyre according to the invention.

I. DETAILED DESCRIPTION OF THE INVENTION

In the present description, unless expressly indicated otherwise, all the percentages (%) shown are % by weight. Furthermore, any range of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

I-1. Gastight Elastomer Composition

The pneumatic object according to the invention has the essential feature of being provided with a layer which is airtight to the inflation gases, comprising an elastomer composition comprising at least, as the sole elastomer or as the predominant elastomer by weight present in said composition, a thermoplastic elastomer (TPE), which is a styrene thermoplastic (TPS) elastomer or non-styrene thermoplastic (TPNS) elastomer and preferably a styrene thermoplastic elastomer, associated with which is a hydrocarbon resin, and optionally an extender oil of said elastomer at from 0 to 150 phr (parts by weight per hundred parts of elastomer).

I-1-A. Thermoplastic Elastomer TPE

Thermoplastic elastomers (abbreviated to TPE) have a structure intermediate between thermoplastic polymers and elastomers. They are block copolymers composed of rigid thermoplastic sequences connected via flexible elastomer sequences, for example polybutadiene, polyisoprene, poly (ethylene/butylene) or else polyisobutylene. They are often triblock elastomers with two rigid segments connected via a flexible segment. The rigid and flexible segments can be positioned linearly, in star fashion or in branched fashion. Typically, each of these segments or blocks often contains at least more than 5, generally more than 10, base units (for example, styrene units and isobutylene units for a styrene/isobutylene/styrene block copolymer).

According to the invention, the flexible elastomer sequences mainly consist of "polyisobutylene" blocks.

According to one preferred variant of the invention, the thermoplastic elastomer block copolymer is in a linear triblock form. The block copolymer may then be composed of a central "polyisobutylene" block and of two terminal thermoplastic blocks, at each of the two ends of the "polyisobutylene" block.

According to another variant of the invention, the thermoplastic elastomer block copolymer is in a star-shaped form, with at least three branches. The block copolymer may then be composed of a star-shaped "polyisobutylene" block with at least three branches and of a thermoplastic block located at the end of each of the branches of the "polyisobutylene". The number of branches of the "polyisobutylene" may vary for example from 3 to 12, and preferably from 3 to 6.

According to another variant of the invention, the thermoplastic elastomer block copolymer is in a branched or dendrimer form. The block copolymer may then be composed of a branched or dendritic "polyisobutylene" block and of a thermoplastic block located at the end of the branches of the dendritic "polyisobutylene".

Thus, the thermoplastic elastomer used for the implementation of the invention is a block copolymer comprising at least a central polyisobutylene block, denoted by Block Copolymer. According to the case, it may furthermore be of two types depending on whether or not it comprises a styrene block in addition to the polyisobutylene block or blocks. The thermoplastics according to the invention will then be denoted as TPIBS (thermoplastics comprising isobutylene and styrene blocks) or TPIBNS (thermoplastics comprising isobutylene and non-styrene blocks).

The number-average molecular weight (denoted by $M_n$) of the Block Copolymer is preferably between 30 000 and 500 000 g/mol, more preferably between 40 000 and 400 000 g/mol. Below the minimum values indicated, the cohesion between the elastomer chains of the TPE, especially due to its optional dilution (in the presence of an extender oil), runs the risk of being adversely affected; moreover, an increase in the usage temperature runs the risk of adversely affecting the mechanical properties, especially the properties at break, consequently leading to reduced "hot" performance. Moreover, too high a weight $M_n$ may be detrimental as regards the flexibility of the gastight layer. Thus, it has been observed that a value lying within a range of 50 000 to 300 000 g/mol was particularly suitable, especially for use of the Block Copolymer in a composition for a pneumatic tyre.

The number-average molecular weight ($M_n$) of the TPE elastomer is determined in a known way by size exclusion chromatography (SEC). The sample is dissolved beforehand in tetrahydrofuran at a concentration of approximately 1 g/l; the solution is then filtered through a filter with a porosity of 0.45 μm before injection. The equipment used is a "Waters alliance" chromatographic line. The elution solvent is tetrahydrofuran, the flow rate is 0.7 ml/min, the temperature of the system is 35° C. and the analytical time is 90 min. A set of four Waters columns in series, with "Styragel" trade names ("HMW7", "HMW6E" and two "HT6E"), is used. The injected volume of the solution of the polymer sample is 100 μl. The detector is a "Waters 2410" differential refractometer and its associated software for handling the chromatographic data is the "Waters Millenium" system. The calculated average molecular weights are relative to a calibration curve produced with polystyrene standards.

The value of the polydispersity index $I_p$ (it should be remembered that $I_p=M_w/M_n$ with $M_w$ the weight-average molecular weight and $M_n$ the number-average molecular weight) of the Block Copolymer is preferably less than 3; more preferably less than 2 and more preferably still less than 1.5.

According to the invention, the "polyisobutylene" block of the Block Copolymer is composed predominantly of units derived from isobutene. The term "predominantly" is understood to mean the highest weight content of monomer relative to the total weight of the "polyisobutylene" block, and preferably a weight content of more than 50%, more preferably of more than 75% and more preferably still of more than 85%.

According to the invention, the "polyisobutylene" block of the Block Copolymer has a number-average molecular weight ("$M_n$") ranging from 25 000 g/mol to 350 000 g/mol, preferably from 35 000 g/mol to 250 000 g/mol so as to give the TPE good elastomeric properties and a sufficient mechanical strength that is compatible with the inner liner application of a pneumatic tyre.

As is known, such copolymers have two peaks of glass transition temperature ($T_g$, measured according to ASTM D3418), the lowest, negative temperature relating to the "polyisobutylene" sequence of the Block Copolymer, and the highest, positive temperature, typically greater than or equal to 80° C. relating to the (styrene or non-styrene) thermoplastic part of the Block Copolymer. In the present application, when reference is made to the glass transition temperature of the Block Copolymer, it refers to the $T_g$ relating to the "polyisobutylene" block.

The Block Copolymer preferably has a glass transition temperature ("$T_g$") which is preferably less than or equal to −20° C., more preferably less than or equal to −40° C. A $T_g$ value above these minimum values may reduce the performances of the airtight layer during use at very low temperature; for such a use, the $T_g$ of the Block Copolymer is more preferably still less than or equal to −50° C.

Advantageously according to the invention, the "polyisobutylene" block of the Block Copolymer may also comprise one or more conjugated dienes inserted into the polymer chain. The content of units derived from dienes is defined by the airtightness properties that the Block Copolymer must have. Preferably, the content of units derived from dienes ranges from 0.5% to 16% by weight relative to the weight of the "polyisobutylene" block, more preferably from 1% to 10% by weight and more preferably still from 2% to 8% by weight relative to the weight of the "polyisobutylene" block.

The conjugated dienes that may be copolymerized with the isobutylene in order to form the polyisobutylene block are preferably $C_4$-$C_{14}$ conjugated dienes. Preferably, these conjugated dienes are selected from isoprene, butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene or a mixture thereof. More preferably, the conjugated diene is isoprene or a mixture containing isoprene.

The "polyisobutylene" block, according to one advantageous aspect of the invention, may be halogenated and comprise halogen atoms in its chain. This halogenation makes it possible to increase the crosslinking rate of the composition comprising the Block Copolymer. The halogenation takes place by means of bromine or chlorine, preferably bromine, over the units derived from conjugated dienes of the polymer chain of the "polyisobutylene" block. Only one portion of these units reacts with the halogen. This reactive portion of units derived from conjugated dienes is preferably such that the amount of units derived from conjugated dienes that have not reacted with the halogen is at least 0.5% by weight relative to the weight of the "polyisobutylene" block.

I-1-A-a Thermoplastic Elastomer Comprising a Styrene Block (TPIBS)

In a first variant of the invention, use is made of a thermoplastic elastomer which is a Block Copolymer comprising at least a central polyisobutylene block and adjacent blocks consisting of at least a polymerized styrene monomer.

The expression "styrene monomer" should be understood to mean, in the present description, any monomer based on unsubstituted or substituted styrene; mention may be made, among substituted styrenes, for example, of methylstyrenes (for example, o-methylstyrene, m-methylstyrene or p-methylstyrene, α-methylstyrene, α,2-dimethylstyrene, α,4-dimethyl-styrene or diphenylethylene), para-(tert-butyl)styrene, chlorostyrenes (for example, o-chloro-styrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromo-styrene, 2,4-dibromostyrene, 2,6-dibromostyrene or 2,4,6-tribromostyrene), fluorostyrenes (for example, o-fluorostyrene, m-fluorostyrene, p-fluorostyrene, 2,4-difluorostyrene, 2,6-difluorostyrene or 2,4,6-trifluorostyrene) or para-hydroxystyrene.

Thus, the elastomer according to this first variant of the invention may especially be selected from the group consisting of styrene/isobutylene/styrene (SIBS) Block Copolymers.

The expression "SIBS elastomer or copolymer" is understood to mean, in the present application, by definition, any styrene/isobutylene/styrene triblock elastomer in which the central polyisobutylene block may or may not be interrupted by one or more unsaturated units, in particular one or more diene units such as isoprene units, which are optionally halogenated.

According to one preferred embodiment of the invention, the weight content of styrene in the TPIBS elastomer is between 5% and 50%. Below the minimum value indicated, the thermoplastic nature of the elastomer risks being substantially reduced, whereas, above the recommended maximum value, the elasticity of the airtight layer may be adversely affected. For these reasons, the styrene content is more preferably between 10% and 40%, in particular between 15% and 35%.

It is preferable for the glass transition temperature ($T_g$, measured according to ASTM D3418) of the TPIBS elastomer to be below −20° C., more preferably below −40° C. A $T_g$ value above these minimum values may reduce the performances of the airtight layer during use at very low temperature; for such a use, the $T_g$ of the TPIBS elastomer is more preferably still below −50° C.

The TPIBS elastomer and the resin may, by themselves alone, constitute the gastight elastomer layer or else may be combined, in the elastomer composition, with other elastomers.

If other optional elastomers are used in the composition, the TPIBS elastomer constitutes the predominant elastomer by weight; it then preferably represents more than 50% and more preferably more than 70% by weight of all of the elastomers present in the elastomer composition. Such additional elastomers, in the minority by weight, could for example be diene elastomers such as natural rubber or a synthetic polyisoprene, a butyl rubber or thermoplastic elastomers other than styrene thermoplastic elastomers, within the limit of the compatibility of their microstructures.

However, according to one preferred embodiment, the TPIBS, in particular SIBS, elastomer is the sole elastomer, and the sole thermoplastic elastomer present in the elastomer composition of the gastight layer.

The TPIBS elastomers can be processed conventionally for TPEs, by extrusion or moulding, for example starting from a raw material available in the form of beads or granules.

The TPIBS elastomers are available commercially, for example sold, as regards the SIBS, by Kaneka under the name "Sibstar" (e.g. "Sibstar 102T", "Sibstar 103T", "Sibstar 073T"). They have, for example, been described, along with their synthesis, in the patent documents EP 731 112, U.S. Pat. Nos. 4,946,899 and 5,260,383. They were developed first of all for biomedical applications and then described in various applications specific to TPE elastomers, as varied as medical equipment, motor vehicle or domestic electrical appliance parts, sheathings for electric wires, or airtight or elastic parts (see, for example, EP 1 431 343, EP 1 561 783, EP 1 566 405 and WO 2005/103146). These elastomers have subsequently been described for applications in the field of tyres (see, for example, WO 2008/145276, WO 2008/145277 and WO 2009/007064).

I-1-A-b Thermoplastic Elastomer Comprising a Specific Block Other than a Styrene Block (TPIBNS)

A second variant of the invention consists in using a thermoplastic elastomer which is a Block Copolymer comprising at least a central polyisobutylene block and adjacent blocks consisting of at least one polymerized monomer, other than a styrene monomer, the glass transition temperature ($T_g$, measured according to ASTM D3418) of said non-styrene polymer constituting the thermoplastic block of the Block Copolymer is greater than or equal to 100° C. In this case, the Block Copolymer preferably has the following structural features:
- the "polyisobutylene" block has a number-average molecular weight ("$M_n$") ranging from 25 000 g/mol to 350 000 g/mol and a glass transition temperature ("$T_g$") of less than or equal to −20° C.,
- the adjacent thermoplastic blocks consist of at least one polymerized monomer, other than a styrene monomer and have a higher glass transition temperature ("$T_g$") greater than or equal to 100° C.

The thermoplastic blocks preferably have a $T_g$ greater than or equal to 100° C. According to one preferred aspect of the invention, the $T_g$ of the thermoplastic block is greater than or equal to 130° C., more preferably still greater than or equal to 150° C., or even greater than or equal to 200° C.

The proportion of the thermoplastic blocks relative to the Block Copolymer, as defined for the implementation of the invention, is determined on the one hand by the thermoplasticity properties that said copolymer must have. The thermoplastic blocks having a $T_g$ greater than or equal to 100° C. are preferably present in proportions sufficient to preserve the thermoplastic nature of the elastomer according to the invention. The minimum content of thermoplastic blocks having a $T_g$ greater than or equal to 100° C. of the Block Copolymer may vary as a function of the usage conditions of the copolymer. On the other hand, the ability of the Block Copolymer to deform during the conformation of the tyre may also contribute to determining the proportion of the thermoplastic blocks having a $T_g$ greater than or equal to 100° C.

The expression "thermoplastic block having a $T_g$ greater than or equal to 100° C." should be understood, in the present description, to mean any polymer based on at least one polymerized monomer, other than a styrene monomer, the glass transition temperature of which is greater than or equal to 100° C.

The expression "polymerized monomer, other than a styrene monomer" should be understood, in the present description, to mean any monomer, other than a styrene monomer, polymerized according to techniques known to a person skilled in the art and which may result in the preparation of a Block Copolymer as used for the implementation of the invention.

By way of illustrative but nonlimiting example, the polymerized monomers other than styrene monomers according to the invention and which can be used for the preparation of thermoplastic blocks having a $T_g$ greater than or equal to 100° C. may be selected from the following compounds and mixtures thereof:
- acenaphthylene: a person skilled in the art may, for example, refer to the article by Z. Fodor and J. P. Kennedy, Polymer Bulletin, 1992, 29(6), 697-705;
- indene and its derivatives, such as, for example, 2-methylindene, 3-methylindene, 4-methylindene, dimethylindenes, 2-phenylindene, 3-phenylindene and 4-phenylindene. A person skilled in the art may, for example, refer to the patent document U.S. Pat. No. 4,946,899 by the inventors Kennedy, Puskas, Kaszas and Hager and to the documents: J. E. Puskas, G. Kaszas, J. P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;

isoprene, then resulting in the formation of a certain number of trans-1,4-polyisoprene units and of units cyclized according to an intramolecular process. A person skilled in the art may, for example, refer to the documents: G. Kaszas, J. E. Puskas, J. P. Kennedy, Applied Polymer Science (1990) 39(1) 119-144 and J. E. Puskas, G. Kaszas, J. P. Kennedy, Macromolecular Science, Chemistry A28 (1991) 65-80;

esters of acrylic acid, crotonic acid, sorbic acid and methacrylic acid, derivatives of acrylamide, derivatives of methacrylamide, derivatives of acrylonitrile, derivatives of methacrylonitrile and mixtures thereof. Mention may more particularly be made of adamantyl acrylate, adamantyl crotonate, adamantyl sorbate, 4-biphenylyl acrylate, tert-butyl acrylate, cyanomethyl acrylate, 2-cyanoethyl acrylate, 2-cyanobutyl acrylate, 2-cyanohexyl acrylate, 2-cyanoheptyl acrylate, 3,5-dimethyladamantyl acrylate, 3,5-dimethyladamantyl crotonate, isobornyl acrylate, pentachlorobenzyl acrylate, pentafluorobenzyl acrylate, pentachloro-phenyl acrylate, pentafluorophenyl acrylate, adamantyl methacrylate, 4-(tert-butyl)-cyclohexyl methacrylate, tert-butyl methacrylate, 4-(tert-butyl)phenyl methacrylate, 4-cyanophenyl methacrylate, 4-cyanomethylphenyl methacrylate, cyclohexyl methacrylate, 3,5-dimethyladamantyl methacrylate, dimethylaminoethyl methacrylate, 3,3-dimethylbutyl methacrylate, methacrylic acid, methyl methacrylate, ethyl methacrylate, phenyl methacrylate, isobornyl methacrylate, tetradecyl methacrylate, trimethylsilyl methacrylate, 2,3-xylenyl methacrylate, 2,6-xylenyl methacrylate, acrylamide, N-(sec-butyl)acrylamide, N-(tert-butyl) acrylamide, N,N-diisopropylacrylamide, N-(1-methylbutyl)acrylamide, N-methyl-N-phenylacrylamide, morpholylacrylamide, piperidylacrylamide, N-(tert-butyl)meth-acrylamide, 4-butoxycarbonylphenylmethacrylamide, 4-carboxyphenylmethacrylamide, 4-methoxycarbonylphenylmethacrylamide, 4-ethoxycarbonylphenylmethacrylamide, butyl cyanoacrylate, methyl chloroacrylate, ethyl chloroacrylate, isopropyl chloroacrylate, isobutyl chloroacrylate, cyclohexyl chloroacrylate, methyl fluoromethacrylate, methyl phenylacrylate, acrylonitrile, methacrylonitrile and mixtures thereof.

According to one variant of the invention, the polymerized monomer other than a styrene monomer can be copolymerized with at least one other monomer so as to form a thermoplastic block having a $T_g$ greater than or equal to 100° C. According to this aspect, the molar fraction of polymerized monomer other than a styrene monomer, with respect to the total number of units of the thermoplastic block, must be sufficient to achieve a $T_g$ greater than or equal to 100° C., preferably greater than or equal to 130° C., more preferably still greater than or equal to 150° C., or even greater than or equal to 200° C. Advantageously, the molar fraction of this other comonomer can range from 0 to 90%, more preferably from 0 to 75% and more preferably still from 0 to 50%.

By way of illustration, this other monomer capable of copolymerizing with the polymerized monomer other than a styrene monomer can be selected from diene monomers, more particularly conjugated diene monomers having from 4 to 14 carbon atoms, and monomers of vinylaromatic type having from 8 to 20 carbon atoms.

When the comonomer is a conjugated diene having from 4 to 12 carbon atoms, it advantageously represents a molar fraction, with respect to the total number of units of the thermoplastic block, ranging from 0 to 25%. Suitable as conjugated dienes which can be used in the thermoplastic blocks according to the invention are those described above, namely isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene or mixtures thereof.

When the comonomer is of vinylaromatic type, it advantageously represents a fraction of units, with regard to the total number of units of the thermoplastic block, from 0 to 90%, preferably ranging from 0 to 75% and more preferably still ranging from 0 to 50%. Suitable in particular as vinylaromatic compounds are the abovementioned styrene monomers, namely methylstyrenes, para-(tert-butyl)styrene, chlorostyrenes, bromostyrenes, fluorostyrenes or para-hydroxystyrene. Preferably, the comonomer of vinylaromatic type is styrene.

Mention may be made, as illustrative but nonlimiting examples, of mixtures of comonomers, which can be used for the preparation of thermoplastic blocks having a $T_g$ greater than or equal to 100° C., composed of indene and of styrene derivatives, in particular para-methylstyrene or para-(tert-butyl)styrene. A person skilled in the art may then refer to the documents: J. E. Puskas, G. Kaszas, J. P. Kennedy and W. G. Hager, Journal of Polymer Science, Part A: Polymer Chemistry, 1992, 30, 41, or J. P. Kennedy, S. Midha and Y. Tsungae, Macromolecules (1993), 26, 429.

Preparation of the TPIBNS Block Copolymers

The Block Copolymers as defined for the implementation of the invention may be prepared by known methods of synthesis. A person skilled in the art will know how to select the appropriate polymerization conditions and how to adjust the various parameters of the polymerization processes in order to arrive at the specific structural characteristics of the Block Copolymer of use for the implementation of the invention.

Several synthesis strategies can be implemented with a view to preparing the copolymers of use for the implementation of the invention.

A first one consists of a first step of synthesis of the "polyisobutylene" block by living cationic polymerization of the monomers to be polymerized using a monofunctional, difunctional or polyfunctional initiator known to a person skilled in the art, followed by a second step of synthesis of the thermoplastic block(s) having a $T_g$ greater than or equal to 100° C. and by addition of the monomer to be polymerized to the living polyisobutylene obtained in the first step. Thus, these two steps are consecutive, which results in the sequential addition:

of the monomers to be polymerized for the preparation of the "polyisobutylene" block;

of the monomers to be polymerized for the preparation of the thermoplastic block(s) having a $T_g$ greater than or equal to 100° C.

In each step, the monomer(s) to be polymerized may or may not be added in the form of a solution in a solvent as described below, in the presence or absence of a Lewis acid or base as described below.

Each of these steps may be carried out in the same reactor, or in two different polymerization reactors. Preferably, these two steps are carried out in one and the same reactor ("one-pot" synthesis).

The living cationic polymerization is conventionally carried out using a difunctional or polyfunctional initiator and optionally a Lewis acid acting as a coinitiator in order to form, in situ, a carbocation. Customarily, electron-donor compounds are added in order to give the polymerization a living character.

By way of illustration, the difunctional or polyfunctional initiators that can be used for the preparation of the copolymers according to the invention may be selected from 1,4-di(2-methoxy-2-propyl)benzene (or "dicumyl methyl ether"), 1,3,5-tri(2-methoxy-2-propyl)-benzene (or "tricumyl methyl ether"), 1,4-di(2-chloro-2-propyl)benzene (or "dicumyl chloride"), 1,3,5-tri(2-chloro-2-propyl)benzene (or "tricumyl chloride"), 1,4-di(2-hydroxy-2-propyl)benzene, 1,3,5-tri(2-hydroxy-2-propyl)benzene, 1,4-di(2-acetoxy-2-propyl)benzene, 1,3,5-tri(2-acetoxy-2-propyl)benzene, 2,6-dichloro-2,4,4,6-tetramethylheptane, 2,6-dihydroxy-2,4,4,6-heptane. Preferably, dicumyl ethers, tricumyl ethers, dicumyl halides or tricumyl halides are used.

The Lewis acids may be selected from metal halides of general formula $MX_n$ where M is an element selected from Ti, Zr, Al, Sn, P, B, and X is a halogen such as Cl, Br, F or I and n corresponding to the degree of oxidation of the element M. Mention will be made, for example, of $TiCl_4$, $AlCl_3$, $BCl_3$, $BF_3$, $SnCl_4$, $PCl_3$, $PCl_5$. Among these compounds, preferably $TiCl_4$, $AlCl_3$ and $BCl_3$, and more preferably still $TiCl_4$, are used.

The electron-donor compounds may be selected from known Lewis bases, such as pyridines, amines, amides, esters, sulphoxides and others. Among these, DMSO (dimethylsulphoxide) and DMAc (dimethyl acetamide) are preferred.

The living cationic polymerization is carried out in an apolar inert solvent or in a mixture of apolar and polar inert solvents.

The apolar solvents that can be used for the synthesis of the copolymers according to the invention are, for example, aliphatic, cycloaliphatic or aromatic hydrocarbon solvents, such as hexane, heptane, cyclohexane, methylcyclohexane, benzene or toluene.

The polar solvents that can be used for the synthesis of the copolymers according to the invention are, for example, halogenated solvents such as alkane halides, for instance methyl chloride (or chloroform), ethyl chloride, butyl chloride, methylene chloride (or dichloromethane) or chlorobenzenes (mono-, di- or tri-chloro).

A person skilled in the art will know how to select the composition of the mixtures of monomers to be used in order to prepare the thermoplastic elastomeric block copolymers according to the invention and also the appropriate temperature conditions in order to achieve the molecular weight characteristics of these copolymers.

By way of illustrative but nonlimiting example, and in order to implement this first synthesis strategy, a person skilled in the art will be able to refer to the following documents for the synthesis of a Block Copolymer based on isobutylene and on:

acenaphthylene: the article by Z. Fodor and J. P. Kennedy, Polymer Bulletin 1992 29(6) 697-705;
indene: the patent document U.S. Pat. No. 4,946,899 by the inventors Kennedy, Puskas, Kaszas and Hager and the documents: J. E. Puskas, G. Kaszas, J. P. Kennedy, W. G. Hager, Journal of Polymer Science Part A: Polymer Chemistry (1992) 30, 41 and J. P. Kennedy, N. Meguriya, B. Keszler, Macromolecules (1991) 24(25), 6572-6577;
isoprene: the documents: G. Kaszas, J. E. Puskas, J. P. Kennedy, Applied Polymer Science (1990) 39(1) 119-144 and J. E. Puskas, G. Kaszas, J. P. Kennedy, Macromolecular Science, Chemistry A28 (1991) 65-80.

A second synthesis strategy consists in separately preparing:

a "polyisobutylene" block that is telechelic or functional at one or more of its chain ends by living cationic polymerization using a monofunctional, difunctional or polyfunctional initiator, optionally followed by a functionalization reaction on one or more of the chain ends;
the living thermoplastic block(s), for example by anionic polymerization, which have a $T_g$ greater than or equal to 100° C.,
then in reacting both of them in order to obtain a Block Copolymer of use for the implementation of the invention. The nature of the reactive functions at at least one of the chain ends of the "polyisobutylene" block and the proportion of living chains of the polymer constituting the thermoplastic block having a $T_g$ greater than or equal to 100° C., relative to the amount of these reactive functions will be chosen by a person skilled in the art in order to obtain a Block Copolymer of use for the implementation of the invention.

A third synthesis strategy consists in carrying out, in this order:

the synthesis of a "polyisobutylene" block that is telechelic or functional at one or more of its chain ends by living cationic polymerization using a monofunctional, difunctional or polyfunctional initiator;
the chain-end modification of this "polyisobutylene" so as to introduce a monomer unit that can be lithiated;
optionally, the supplementary addition of a monomer unit that can be lithiated and can result in a species capable of initiating an anionic polymerization, such as for example 1,1-diphenylethylene;
finally, the addition of the polymerizable monomer and of optional comonomers via an anionic route.

By way of example, for the implementation of such a synthesis strategy, a person skilled in the art may refer to the communication by Kennedy and Price, ACS Symposium, 1992, 496, 258-277 or to the article by Faust et al.: Facile synthesis of diphenylethylene end-functional polyisobutylene and its applications for the synthesis of block copolymers containing poly(methacrylate)s, by Dingsong Feng, Tomoya Higashihara and Rudolf Faust, Polymer, 2007, 49(2), 386-393).

The halogenation of the copolymer according to the invention is carried out according to any method known to a person skilled in the art, especially those used for the halogenation of butyl rubber, and may take place, for example, using bromine or chlorine, preferably bromine, on the conjugated diene-based units of the polymer chain of the "polyisobutylene" block and/or of the thermoplastic block(s).

In certain variants of the invention according to which the thermoplastic elastomer is a star or branched elastomer, the processes described, for example, in the articles by Puskas, J. Polym. Sci. Part A: Polymer Chemistry, vol. 36, pp 85-82 (1998) and Puskas, J. Polym. Sci. Part A: Polymer Chemistry, vol. 43, pp 1811-1826 (2005) may be performed by analogy in order to obtain living star, branched or dendrimer "polyisobutylene" blocks.

A person skilled in the art will then know how to select the composition of the mixtures of monomers to be used in order to prepare the copolymers according to the invention and also the appropriate temperature conditions in order to achieve the molecular weight characteristics of these copolymers.

Preferably, the copolymers according to the invention will be prepared by living cationic polymerization using a difunctional or polyfunctional initiator and by sequential additions of the monomers to be polymerized for the synthesis of the "polyisobutene" block and of the monomers to be polymerized for the synthesis of the thermoplastic block(s) having a $T_g$ greater than or equal to 100° C.

The TPIBS or TPIBNS block thermoplastic elastomer according to the invention as defined previously may by itself constitute the elastomer composition or may be combined, in this composition, with other constituents in order to form an elastomeric matrix.

If other optional elastomers are used in this composition, the Block Copolymer as described previously constitutes the predominant elastomer by weight, i.e., the weight fraction of the Block Copolymer relative to all of the elastomers is the highest. The Block Copolymer preferably represents more than 50% and more preferably more than 70% by weight of all of the elastomers. Such additional elastomers may, for example, be diene elastomers or styrene thermoplastic (TPS) elastomers, within the limit of the compatibility of their microstructures.

As diene elastomers that can be used in addition to the Block Copolymer described previously, mention may be made especially of polybutadienes (BR), synthetic polyisoprenes (IR), natural rubber (NR), butadiene copolymers, isoprene copolymers and mixtures of these elastomers. Such copolymers are more preferably selected from the group consisting of butadiene-styrene (SBR) copolymers, isoprene-butadiene (BIR) copolymers, isoprene-styrene (SIR) copolymers, isoprene-isobutylene (IIR) copolymers, isoprene-butadiene-styrene (SBIR) copolymers, and mixtures of such copolymers.

As TPE elastomer that can be used in addition to the Block Copolymer described previously, mention may be made especially of a TPS elastomer selected from the group consisting of styrene/butadiene/styrene (SBS) block copolymers, styrene/isoprene/styrene (SIS) and styrene/butylene/styrene block copolymers, styrene/butadiene/isoprene/styrene (SBIS) block copolymers, styrene/ethylene/butylene/styrene (SEBS) block copolymers, styrene/ethylene/propylene/styrene (SEPS) block copolymers, styrene/ethylene/ethylene/propylene/styrene (SEEPS) block copolymers, styrene/ethylene/ethylene/styrene (SEES) block copolymers, and mixtures of these copolymers. More preferably, said optional additional TPS elastomer is selected from the group consisting of SEBS block copolymers, SEPS block copolymers and mixtures of these copolymers.

I-1-B. Hydrocarbon Resin

The Second Essential Constituent of the Airtight Composition is a Hydrocarbon Resin.

The term "resin" is reserved in the present application, by definition, as known to those skilled in the art, to a compound that is solid at room temperature (23° C.), as opposed to a liquid plasticizing compound such as an oil.

Hydrocarbon resins are polymers well known to those skilled in the art, essentially based on carbon and hydrogen, which can be used in particular as plasticizing agents in polymeric matrices. They have been described for example in the work entitled "Hydrocarbon Resins" by R. Mildenberg, M. Zander and G. Collin (New York, VCH, 1997, ISBN 3-527-28617-9), Chapter 5 of which is devoted to their applications, especially in rubber tyres (5.5. "*Rubber Tires and Mechanical Goods*"). They may be aliphatic, cycloaliphatic, aromatic, hydrogenated aromatic, of the aliphatic/aromatic type, i.e., based on aliphatic and/or aromatic monomers. They may be natural or synthetic, whether or not based on petroleum (if such is the case, they are also known as petroleum resins). They are by nature miscible (i.e., compatible) in the amounts used with the polymer compositions for which they are intended, so as to act as true diluents. Their $T_g$ is preferably above 0° C., especially above 20° C. (usually between 30° C. and 120° C.).

As is known, these hydrocarbon resins may also be termed thermoplastic resins in the sense that they soften when heated and may thus be moulded. They may also be defined by a softening point or temperature, at which temperature the product, for example in powder form, cakes together. The softening point of a hydrocarbon resin is generally about 50 to 60° C. higher than its $T_g$ value.

In the composition of the invention, the softening point of the resin is preferably above 40° C. (in particular between 40° C. and 160° C.), more preferably above 50° C. (in particular between 50° C. and 150° C.).

Said resin is preferably used at a weight content ranging from 5 to 600 phr. Below 5 phr, the improvement in airtightness has proved to be insufficient, whereas above 600 phr, there is a risk of excessive stiffness. For these reasons, the resin content is preferably from 5 to 300 phr, more preferably from 10 to 150 phr, more preferably still from 10 to 100 phr and very preferably from 15 to 70 phr. More preferably still, the weight content of hydrocarbon resin is from 25 to 70 phr.

According to one preferred embodiment of the invention, the hydrocarbon resin has at least any one, and more preferably all, of the following characteristics:
- a $T_g$ above 10° C., and more preferably above 30° C.;
- a softening point above 50° C., preferably above 80° C. (in particular between 80° C. and 160° C.);
- a number-average molecular weight ($M_N$) between 200 and 3000 g/mol;
- a polydispersity index ($I_p$) less than or equal to 4 (it should be remembered that $I_p = M_w/M_n$ with $M_w$ the weight-average molecular weight).

More preferably, this hydrocarbon resin has at least any one, and more preferably all, of the following characteristics:
- a $T_g$ between 30° C. and 120° C. (especially between 35° C. and 105° C.);
- a softening point above 90° C., in particular between 110° C. and 150° C.;
- a molecular weight $M_n$ between 400 and 1500 g/mol;
- a polydispersity index $I_p$ less than 3 and in particular less than 2.

The softening point is measured according to the ISO 4625 standard ("Ring and Ball" method). The $T_g$ is measured according to the ASTM D3418 (1999) standard. The macrostructure ($M_w$, $M_n$ and $I_p$) of the hydrocarbon resin is determined by size exclusion chromatography (SEC): tetrahydrofuran solvent; 35° C. temperature; 1 g/l concentration; 1 ml/min flow rate; solution filtered on a filter of 0.45 μm porosity before injection; Moore calibration using polystyrene standards; set of three Waters columns in series ("Styragel" HR4E, HR1 and HR0.5); differential refractometer (Waters 2410) detection and its associated operating software (Waters Empower).

As examples of such hydrocarbon resins, mention may be made of those selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$-cut homopolymer or copolymer resins, $C_9$-cut homopolymer or copolymer resins, α-methylstyrene homopolymer or copolymer resins and blends of these resins. Among the above copolymer resins, mention may more particularly be made of those selected from the group consisting of (D)CPD/vinylaromatic copolymer resins, (D)CPD/terpene copolymer resins, (D)CPD/$C_5$-cut copolymer resins, (D)CPD/$C_9$-cut copolymer resins, terpene/vinylaromatic copolymer resins, terpene/phenol copolymer resins, $C_5$-cut/vinylaromatic copolymer resins and blends of these resins.

The term "terpene" includes here, as is known, α-pinene, β-pinene and limonene monomers. It is preferable to use a limonene monomer, a compound which, as is known, can take the form of three possible isomers: L-limonene (laevorotatory enantiomer), D-limonene (dextrorotatory enantiomer), or else dipentene (the racemic mixture of the dextrorotatory and laevorotatory enantiomers). Suitable vinylaromatic monomers are for example: styrene, α-methylstyrene, ortho-methylstyrene, meta-methylstyrene and para-methylstyrene, vinyltoluene, para-(tert-butyl)styrene, methoxystyrenes, chlorostyrenes, hydroxystyrenes, vinylmesitylene, divinylbenzene, vinylnaphthalene and any vinylaromatic monomer derived from a $C_9$-cut (or more generally a $C_8$- to $C_{10}$-cut).

More particularly, mention may be made of resins selected from the group consisting of (D)CPD homopolymer resins, (D)CPD/styrene copolymer resins, polylimonene resins, limonene/styrene copolymer resins, limonene/D(CPD) copolymer resins, $C_5$-cut/styrene copolymer resins, $C_5$-cut/$C_9$-cut copolymer resins and blends of these resins.

All the above resins are well known to those skilled in the art and are commercially available, for example sold by DRT under the name "Dercolyte" as regards polylimonene resins, sold by Neville Chemical Company under the name "Super Nevtac", by Kolon under the name "Hikorez" or by Exxon Mobil under the name "Escorez" as regards $C_5$-cut/styrene resins or $C_5$-cut/$C_9$-cut resins, or else by Struktol under the name "40 MS" or "40 NS" (blends of aromatic and/or aliphatic resins) or else by Eastman under the name "Eastotac", such as "Eastotac H-142W" as regards hydrogenated aliphatic hydrocarbon resins.

I-1-C. Extender Oil

The TPE elastomer and the resin are sufficient by themselves alone to fulfil the function of gastightness with regard to the pneumatic objects in which they are used.

However, according to a preferred embodiment of the invention, the elastomer composition described above also comprises, as plasticizing agent, an extender oil (or plasticizing oil) at a content at most equal to 150 phr, and preferably less than 150 phr, the role of which is to facilitate the processing of the gastight layer, particularly its incorporation in the pneumatic object, by a lowering of the modulus and an increase in the tackifying power.

Use may be made of any extender oil, preferably having a weakly polar nature, capable of extending or plasticizing elastomers, in particular thermoplastic elastomers. At room temperature (23° C.), these oils, which are more or less viscous, are liquids (that is to say, to recapitulate, substances having the ability to eventually assume the shape of their container), in contrast in particular to resins or rubbers, which are solids by nature.

Preferably, the extender oil is selected from the group consisting of polyolefin oils (that is to say that result from the polymerization of olefins, monoolefins or diolefins), paraffinic oils, naphthenic oils (of low or high viscosity), aromatic oils, mineral oils and mixtures of these oils.

While it has been found that the addition of oil admittedly takes place at the cost of a certain loss in airtightness, which can vary according to the type and the amount of oil used, this loss in airtightness can be largely mitigated by adjusting the content of platy filler.

Use is preferably made of an oil of polybutene type, in particular a polyisobutylene oil (abbreviated to "PIB"), which has demonstrated the best compromise of properties in comparison with the other oils tested, in particular with a conventional oil of the paraffinic type.

By way of examples, polyisobutylene oils are sold in particular by Univar under the name "Dynapak Poly" (e.g., "Dynapak Poly 190"), by Ineos Oligomer under the name "Indopol H1200" or by BASF under the names "Glissopal" (e.g., "Glissopal 1000") or "Oppanol" (e.g., "Oppanol B 12"); paraffinic oils are sold, for example, by Exxon under the name "Telura 618" or by Repsol under the name "Extensol 51".

The number-average molecular weight ($M_n$) of the extender oil is preferably between 200 and 25 000 g/mol and more preferably still between 300 and 10 000 g/mol. For excessively low $M_n$ weights, there exists a risk of migration of the oil outside the composition, whereas excessively high weights can result in excessive stiffening of this composition. An $M_n$ weight of between 350 and 4000 g/mol, in particular between 400 and 3000 g/mol, has proved to constitute an excellent compromise for the target applications, in particular for use in a pneumatic tyre.

The number-average molecular weight ($M_n$) of the extender oil is determined by SEC, the sample being dissolved beforehand in tetrahydrofuran at a concentration of approximately 1 g/l; the solution is then filtered through a filter with a porosity of 0.45 μm before injection. The equipment is the "Waters Alliance" chromatographic line. The elution solvent is tetrahydrofuran, the flow rate is 1 ml/min, the temperature of the system is 35° C. and the analysis time is 30 min. Use is made of a set of two "Waters" columns bearing the name "Styragel HT6E". The injected volume of the solution of the polymer sample is 100 μl. The detector is a "Waters 2410" differential refractometer and its associated software for handling the chromatographic data is the "Waters Millenium" system. The calculated average molecular weights are relative to a calibration curve produced with polystyrene standards.

A person skilled in the art will know how, in the light of the description and exemplary embodiments which follow, to adjust the amount of extender oil as a function of the specific conditions of use of the gastight elastomer layer, in particular of the pneumatic object in which it is intended to be used.

If it is used, it is preferable for the content of extender oil to be less than 150 phr (parts by weight per hundred parts of total elastomer, i.e., TPE elastomer plus any other optional elastomer present in the elastomer composition or layer).

Above the recommended maximum, there is a risk of insufficient cohesion of the composition and of loss of airtightness which may be harmful depending on the application under consideration.

For these reasons, in particular for use of the airtight composition in a pneumatic tyre, it is preferable for the content of extender oil to be less than 150 phr, preferably less than 100 phr, more preferably still less than 75 phr and, very preferably between 5 and 75 phr.

I-1-D. Platy Filler

To further increase the airtightness of the TPE elastomer layer, use may be made of a platy filler. The optional use of platy filler, at a volume content which may be high since it is preferably between 2% and 50%, advantageously makes it possible to lower the permeability coefficient (and thus to increase the airtightness) of the elastomer composition without excessively increasing its modulus, which makes it possible to retain the ease of incorporation of the airtight layer in the pneumatic object.

"Platy" fillers are well known to a person skilled in the art. They have been used in particular in pneumatic tyres to reduce the permeability of conventional gastight layers based on butyl rubber. They are generally used in these butyl-based layers at relatively low contents, usually not exceeding 10 to 15 phr (see, for example, the patent documents US 2004/0194863 and WO 2006/047509).

They are generally provided in the form of stacked plates, platelets, sheets or lamellae, with a more or less marked anisometry. Their aspect ratio (A=L/T) is generally greater than 3, more often greater than 5 or than 10, L representing the length (or greatest dimension) and T representing the average thickness of these platy fillers, these averages being calculated as number averages. Aspect ratios reaching several tens, indeed even several hundreds, are common. Their average length is preferably greater than 1 μm (that is to say that "micrometre-sized" platy fillers are then involved), typically between several μm (for example 5 μm) and several hundred μm (for example 500 μm, indeed even 800 μm).

Preferably, the platy fillers used in accordance with the invention are selected from the group consisting of graphites, phyllosilicates and the mixtures of such fillers. Mention will in particular be made, among phyllosilicates, of clays, talcs, micas or kaolins, it being possible for these phyllosilicates to be unmodified or to be modified, for example by a surface treatment; mention may in particular be made, as examples of such modified phyllosilicates, of micas covered with titanium oxide or clays modified by surfactants ("organo clays").

Use is preferably made of platy fillers having a low surface energy, that is to say which are relatively apolar, such as those selected from the group consisting of graphites, talcs, micas and the mixtures of such fillers, it being possible for the latter to be modified or unmodified, more preferably still selected from the group consisting of graphites, talcs and the mixtures of such fillers. Mention may in particular be made, among graphites, of natural graphites, expanded graphites or synthetic graphites.

Mention may be made, as examples of micas, of the micas sold by Yamaguchi (A51S, A41S, SYA-21R, SYA-21RS, A21S and SYA-41R), or by CMMP (Mica-MU®, Mica-Soft®, Briomica® for example), vermiculites (in particular the vermiculite Shawatec® sold by CMMP or the vermiculite Microlite® sold by W.R. Grace), or modified or treated micas (for example, the Iriodin® range sold by Merck). Mention may be made, as examples of graphites, of the graphites sold by Timcal (Timrex® range). Mention may be made, as examples of talcs, of the talcs sold by Luzenac.

When they are used, the platy fillers described above are used at a content preferably of less than 30% and more preferably of from 2% to 20% by volume of elastomer composition. Such a volume content typically corresponds, taking into account the average density of the platy fillers used (typically between 2.0 and 3.0), that of the TPS elastomers used and a plasticizer content of 40% (67 phr), to a content ranging from 0 to 250 phr, preferably from 10 to 150 phr.

Beyond the limits indicated, there may be a risk of problems of increase of modulus and embrittlement of the composition.

The introduction of platy fillers into the thermoplastic elastomer composition may be carried out according to various known processes, for example by solution mixing, by bulk mixing in an internal mixer or by extrusion mixing.

I-1-E. Various Additives

The airtight layer or composition described above can furthermore comprise the various additives normally present in the airtight layers known to a person skilled in the art. Mention will be made, for example, of reinforcing fillers, such as carbon black or silica, non-reinforcing or inert fillers other than the platy fillers described above, colouring agents which can advantageously be used for the colouring of the composition, plasticizers other than the abovementioned extender oils, protecting agents, such as antioxidants or antiozonants, UV stabilizers, various processing aids or other stabilizers, or else promoters capable of promoting the adhesion to the remainder of the structure of the pneumatic object.

The gastight layer or composition described above is a compound that is solid (at 23° C.) and elastic, which is characterized in particular, owing to its specific formulation, by a very high flexibility and very high deformability.

I-2. Use of the Airtight Layer in a Pneumatic Tyre

The composition based on TPE elastomer described above can be used as airtight layer in any type of pneumatic object. Mention may be made, as examples of such pneumatic objects, of inflatable mattresses, inflatable boats, or balloons or balls used for play or sport.

It is particularly well suited to use as an airtight layer (or layer airtight to any other inflation gas, for example nitrogen) in a pneumatic object, finished product or semi-finished product made of rubber, very particularly in a pneumatic tyre for a motor vehicle, such as a vehicle of two-wheel, passenger or industrial type.

Such an airtight layer is preferably positioned on the internal wall of the pneumatic object, but it can also be fully incorporated in its internal structure.

The thickness of the airtight layer is preferably greater than 0.05 mm, more preferably between 0.1 mm and 10 mm (in particular between 0.1 and 1.0 mm).

It will be easily understood that, depending on the specific fields of application, the dimensions and the pressures at work, the embodiment of the invention can vary, the airtight layer then having several preferred thickness ranges.

Thus, for example, for pneumatic tyres of passenger vehicle type, it can have a thickness of at least 0.05 mm, preferably between 0.1 and 2 mm. According to another example, for pneumatic tyres for heavy-duty or agricultural vehicles, the preferred thickness can be between 1 and 3 mm. According to another example, for pneumatic tyres for vehicles in the civil engineering field or for aircraft, the preferred thickness can be between 2 and 10 mm.

In comparison with a standard airtight layer based on butyl rubber, the airtight layer according to the invention has the advantage of having not only a lower hysteresis and therefore of imparting a lower rolling resistance to the pneumatic tyres, but also an at least equal if not largely improved airtightness, as is demonstrated in the following exemplary embodiments.

II. Exemplary Embodiments of the Invention

The gastight layer described above can advantageously be used in pneumatic tyres for all types of vehicles, in particular passenger vehicles or industrial vehicles, such as heavy-duty vehicles.

By way of example, the single appended figure represents, highly schematically (not to a specific scale), a radial cross section of a pneumatic tyre in accordance with the invention.

This pneumatic tyre 1 comprises a crown 2 reinforced by a crown reinforcement or belt 6, two sidewalls 3 and two beads 4, each of these beads 4 being reinforced with a bead wire 5. The crown 2 is surmounted by a tread not represented in this schematic figure. A carcass reinforcement 7 is wound around the two bead wires 5 in each bead 4, the turn-up 8 of this reinforcement 7 being, for example, positioned towards the outside of the tyre 1, which is here represented fitted on its rim 9. The carcass reinforcement 7 is, in a way known per se, composed of at least one ply reinforced by "radial" cords, for example textile or metal cords, that is to say that these cords are positioned virtually parallel to one another and extend from one bead to the other, so as to form an angle of between 80° and 90° with the median circumferential plane (plane perpendicular to the axis of rotation of the tyre which is situated at mid-distance from the two beads 4 and passes through the middle of the crown reinforcement 6).

The internal wall of the pneumatic tyre 1 comprises an airtight layer 10, for example with a thickness equal to approximately 0.9 mm, on the side of the internal cavity 11 of the pneumatic tyre 1.

This inner layer (or "inner liner") covers the whole of the internal wall of the pneumatic tyre, extending from one sidewall to the other, at least up to the level of the rim flange when the pneumatic tyre is in the fitted position. It defines the radially internal face of said tyre intended to protect the carcass reinforcement from the diffusion of air originating from the space 11 interior to the tyre. It enables the pneumatic tyre to be inflated and kept under pressure. Its airtightness properties must allow it to guarantee a relatively low degree of pressure loss and to keep the tyre inflated, in the normal operating state, for a sufficient period of time, normally of several weeks or several months.

Unlike a conventional pneumatic tyre that uses a composition based on butyl rubber, the pneumatic tyre according to the invention uses, in this example, as the airtight layer 10, an elastomer composition comprising a SIBS elastomer ("Sibstar 102T" with a styrene content of approximately 15%, a $T_g$ of approximately −65° C. and an $M_n$ of approximately 90 000 g/mol), and a hydrocarbon resin (for example, 33 phr of Eastotac H-142W resin), this composition being optionally extended for example with a PIB oil (for example, 33 phr of "H-1200 INEOS" oil—$M_n$ of the order of 2100 g/mol), and/or with a platy filler (for example 54 phr of "Yamaguchi SYA41R" mica).

The tyre provided with its airtight layer (10) as described above may be produced before or after vulcanization (or curing).

In the first case (i.e., before curing of the pneumatic tyre), the airtight layer is simply applied in a conventional manner at the desired place, so as to form the layer 10. The vulcanization is then carried out conventionally. The TPE elastomers described withstand the stresses linked to the vulcanization step well.

An advantageous variant of manufacture for a person skilled in the art of pneumatic tyres will consist, for example, during a first step, in laying down, flat, the airtight layer directly on a building drum, in the form of a layer ("skim") of suitable thickness, before covering the latter with the remainder of the structure of the pneumatic tyre, according to manufacturing techniques well known to a person skilled in the art.

In the second case (i.e., after curing of the pneumatic tyre), the airtight layer is applied to the inside of the cured pneumatic tyre by any appropriate means, for example by bonding, by spraying or else extrusion and blow-moulding of a film of suitable thickness.

In the following examples the airtightness properties were analysed on test specimens of compositions based on TPE elastomer (with and without extender oil, as regards the TPE elastomer, with and without platy fillers, with and without resin and at variable contents).

Use was made, for this analysis, of a rigid-wall permeameter, placed in an oven (temperature at 60° C. in the present case), equipped with a relative pressure sensor (calibrated in the range from 0 to 6 bar) and connected to a tube equipped with an inflation valve. The permeameter can receive standard test specimens in disc form (for example, with a diameter of 65 mm in the present case) and with a uniform thickness which can range up to 3 mm (0.5 mm in the present case). The pressure sensor is connected to a National Instruments data acquisition card (0-10 V analogue four-channel acquisition) which is connected to a computer carrying out continuous acquisition with a frequency of 0.5 Hz (1 point every two seconds). The permeability coefficient (K) is measured from the linear regression line giving the slope a of the pressure loss through the test specimen tested as a function of the time, after stabilization of the system, that is to say the achievement of stable conditions under which the pressure decreases linearly as a function of the time.

EXAMPLE I

Gastight compositions containing the components presented in Table I below were prepared in a conventional manner, for example, by incorporating the various components into a twin-screw extruder, so as to achieve the melting of the matrix and an incorporation of all the ingredients, then using a sheet die making it possible to produce the profiled element, deposited on a liner. The airtightness, represented by the permeability coefficient (K), was measured on test specimens according to the procedure described above.

Only compositions I-2, I-3 and I-4 are in accordance with the invention.

TABLE I

| Formulation | I-1 | I-2 | I-3 | I-4 |
|---|---|---|---|---|
| SIBS 102T - KANEKA - (phr) | 100 | 100 | 100 | 100 |
| PIB oil H1200 - INEOS - (phr) | — | — | — | 33 |
| Eastotac H-142W (phr) | — | 25 | 67 | 33 |
| K ($10^{-17}$ m$^4$ · N$^{-1}$ · s$^{-1}$) | 3.3 | 2.5 | 2.0 | 3 |
| K (base 100) | 100 | 132 | 165 | 110 |

It is observed that the TPE elastomer alone (composition I-1), used without platy filler or extender oil, already has a very good airtightness. The addition of Eastotac H142W resin at 25 and 67 phr (I-2 and I-3) makes it possible to significantly improve the airtightness. In the presence of 33 phr of Indopol H1200 oil (known for reducing the airtightness of the matrix), the introduction of 33 phr Eastotac H142W resin makes it possible to compensate for the negative effect of the oil and to obtain a performance slightly superior to the pure matrix. This result is quite remarkable in itself.

EXAMPLE II

The compositions of Example II comprising the components presented in Table II were prepared in the same manner as those of Example I, optionally using, in addition, an SYA41R-YAMAGUCHI platy filler.

Only composition II-3 is therefore in accordance with the invention.

TABLE II

| Formulation | II-1 | II-2 | II-3 |
|---|---|---|---|
| SIBS 102T - KANEKA - phr | 100 | 100 | 100 |
| PIB oil H1200 - INEOS - phr | 67 | 67 | — |
| Platy filler SYA41R - YAMAGUCHI - % by volume (phr) | — | 10 (54) | 10 (54) |
| Eastotac H-142W- phr | — | — | 67 |
| K ($10^{-17}$ m$^4$ · N$^{-1}$ · s$^{-1}$) | 3.5 | 1.9 | 0.85 |
| K (base 100) | 100 | 185 | 413 |

The comparison of formulations II-1 and II-2 shows the contribution that the fillers make to the airtightness. Formula II-3 demonstrates that the effect of filler and high-$T_g$ resin is cumulative, resulting in excellent airtightness performances.

The invention claimed is:

1. A pneumatic object comprising an elastomer layer airtight to inflation gases, wherein the elastomer layer includes:
   as a sole elastomer, or as a predominant elastomer by weight, at least one thermoplastic elastomer (TPE), the TPE being a block copolymer that includes at least a central polyisobutylene block,
   5 to 75 phr of an extender oil, the extender oil being selected from the group consisting of polyolefin oils, paraffinic oils, naphthenic oils, aromatic oils, mineral oils, and mixtures thereof, and
   15 to 70 phr of a hydrocarbon resin having a glass transition temperature above 10° C., a softening point above 50° C., a number-average molecular weight between 200 and 3000 g/mol, and a polydispersity index less than or equal to 4.

2. The pneumatic object according to claim 1, wherein the softening point of the hydrocarbon resin is from above 50° C. to 160° C.

3. The pneumatic object according to claim 1, wherein a number-average molecular weight of the block copolymer is between 30,000 and 500,000 g/mol.

4. The pneumatic object according to claim 1, wherein the block copolymer includes a block selected from the group consisting of polystyrene; polymethylstyrenes; poly(para-tert-butylstyrene); polychlorostyrenes; polybromostyrenes; polyfluorostyrenes; poly(para-hydroxystyrene); poly-acenaphthylene; polyindene; poly(2-methylindene); poly(3-methylindene); poly(4-methylindene); polydimethylindenes; poly(2-phenylindene); poly(3-phenylindene); poly(4-phenylindene); polyisoprene; polymers of esters of acrylic acid, crotonic acid, sorbic acid, and methacrylic acid; and polymers of derivatives of acrylamide, methacrylamide, acrylonitrile, and methacrylonitrile.

5. The pneumatic object according to claim 4, wherein the block copolymer includes a block selected from the group consisting of polystyrene; polymethylstyrenes; poly(para-tert-butyl styrene); polychlorostyrenes; polybromostyrenes; polyfluorostyrenes; and poly(para-hydroxystyrene).

6. The pneumatic object according to claim 5, wherein the block copolymer is a styrene/isobutylene/styrene copolymer.

7. The pneumatic object according to claim 6, wherein the block copolymer includes between 5% and 50% by weight of styrene.

8. The pneumatic object according to claim 4, wherein the block copolymer includes a block selected from the group consisting of polyacenaphthylene; polyindene; poly(2-methylindene); poly(3-methylindene); poly(4-methylindene); polydimethylindenes; poly(2-phenylindene); poly(3-phenylindene); poly(4-phenylindene); polyisoprene; polymers of esters of acrylic acid, crotonic acid, sorbic acid, and methacrylic acid; and polymers of derivatives of acrylamide, methacrylamide, acrylonitrile, and methacrylonitrile.

9. The pneumatic object according to claim 1, wherein a glass transition temperature of the block copolymer is below −20° C.

10. The pneumatic object according to claim 9, wherein the glass transition temperature of the block copolymer is below −40° C.

11. The pneumatic object according to claim 1, wherein the extender oil is selected from a group that includes polybutene oils.

12. The pneumatic object according to claim 11, wherein the extender oil is a polyisobutylene oil.

13. The pneumatic object according to claim 1, wherein a number-average molecular weight of the extender oil is between 200 and 25,000 g/mol.

14. The pneumatic object according to claim 1, further comprising a platy filler.

15. The pneumatic object according to claim 14, wherein the platy filler is present in an amount of from 2% to 50% by volume.

16. The pneumatic object according to claim 14, wherein the platy filler is selected from the group consisting of graphites; phyllosilicates; and mixtures thereof.

17. The pneumatic object according to claim 16, wherein the platy filler is selected from the group consisting of graphites; talcs; micas; and mixtures thereof.

18. The pneumatic object according to claim 1, wherein the elastomer layer has a thickness greater than 0.05 mm.

19. The pneumatic object according to claim 18, wherein the elastomer layer has a thickness between 0.1 mm and 10 mm.

20. The pneumatic object according to claim 1, wherein the elastomer layer is positioned on an inner wall of the pneumatic object.

21. The pneumatic object according to claim 1, wherein the pneumatic object is at least partially formed of rubber.

22. The pneumatic object according to claim 21, wherein the pneumatic object is a pneumatic tire.

23. The pneumatic object according to claim 1, wherein the pneumatic object is an inner tube.

24. The pneumatic object according to claim 23, wherein the inner tube is a pneumatic tire inner tube.

* * * * *